(12) United States Patent
Kim (10) Patent No.: US 8,211,263 B2
(45) Date of Patent: Jul. 3, 2012

(54) PROCESS AND APPARATUS FOR MAKING AIR-FILLED CELLULAR STRUCTURES FOR USE AS RESILIENT CUSHIONS

(75) Inventor: Daniel Kim, Busan (KR)

(73) Assignee: Applied FT Composite Solutions Inc., Las Vegas, NV (US)

( * ) Notice: Subject to any disclaimer, the term of this patent is extended or adjusted under 35 U.S.C. 154(b) by 48 days.

(21) Appl. No.: 12/553,834

(22) Filed: Sep. 3, 2009

(65) Prior Publication Data

US 2011/0048634 A1    Mar. 3, 2011

(51) Int. Cl.
| | |
|---|---|
| B29C 65/00 | (2006.01) |
| B29C 63/00 | (2006.01) |
| B29C 39/00 | (2006.01) |
| B29C 45/00 | (2006.01) |
| B29C 47/00 | (2006.01) |
| B29C 47/76 | (2006.01) |
| B32B 37/00 | (2006.01) |
| H05B 7/00 | (2006.01) |
| B28B 1/26 | (2006.01) |
| B28B 21/36 | (2006.01) |
| A01J 21/00 | (2006.01) |
| A01J 25/12 | (2006.01) |
| B29C 39/02 | (2006.01) |
| B29C 43/02 | (2006.01) |
| B29C 49/00 | (2006.01) |
| B29C 49/08 | (2006.01) |
| B29C 67/00 | (2006.01) |
| B29C 51/00 | (2006.01) |
| B29D 22/00 | (2006.01) |
| B29D 24/00 | (2006.01) |
| B29D 29/00 | (2006.01) |

(52) U.S. Cl. ........ 156/285; 156/381; 156/382; 156/286; 156/287; 156/707; 264/468; 264/46.8; 264/87; 264/511; 264/526; 264/553; 264/566; 264/568; 264/571; 264/101; 156/758; 425/503; 425/504; 425/546; 425/388; 425/405.1; 425/85; 5/654; 428/69

(58) Field of Classification Search .................. 156/285, 156/286, 287, 381, 382, 707, 758; 264/468, 264/46.8, 87, 511, 526, 553, 566, 568, 571, 264/101; 425/85, 503, 504, 546, 388, 405.1; 5/654; 428/69

See application file for complete search history.

(56) References Cited

U.S. PATENT DOCUMENTS 2,839,440 A    6/1958    Pfeifer et al,

(Continued)

*Primary Examiner* — Khanh P Nguyen
*Assistant Examiner* — Matthew Hoover
(74) *Attorney, Agent, or Firm* — Joseph Hyosuk Kim; JHK Law (57) ABSTRACT

A method for fabricating an air-filled cellular structure for use as a resilient cushion. The method includes providing a molding structure including a shelf substantially surrounding a depression, and a platform that fits within the depression and is selectively movable between a plurality of positions relative to the shelf, moving the platform to a preselected position relative to the shelf, wherein the preselected position corresponds to a substantially predetermined amount of air to be contained by the air-filled cellular structure, and using a vacuum device to draw air from within the depression. The method further includes engaging a first portion of a first expanse of generally air-impermeable material with the shelf, whereby the vacuum device draws a second portion of the first expanse of material against the moveable platform, and bonding a first portion of a second expanse of generally air-impermeable material to the first portion of the first expanse, thereby enclosing a volume of air between the first and second expanses. The method may further include bonding a third portion of the first expanse to a second portion of the second expanse, thereby decreasing the volume of the air enclosed between the first and second expanses.

17 Claims, 5 Drawing Sheets

U.S. PATENT DOCUMENTS

| | | | |
|---|---|---|---|
| 4,501,541 A | | 2/1985 | Bethell et al. |
| 4,637,789 A | * | 1/1987 | Netznik ............... 425/89 |
| 4,698,864 A | | 10/1987 | Graebe |
| 5,407,510 A | * | 4/1995 | Marfilius et al. ........... 156/212 |
| 5,851,457 A | * | 12/1998 | Peterson et al. ........... 264/46.5 |
| 2003/0161999 A1 | | 8/2003 | Kannankeril et al. |
| 2004/0237201 A1 | * | 12/2004 | Fraser et al. ............... 5/654 |
| 2007/0011815 A1 | | 1/2007 | Fraser et al. |
| 2008/0196166 A1 | | 8/2008 | Fraser |

\* cited by examiner

PROCESS AND APPARATUS FOR MAKING AIR-FILLED CELLULAR STRUCTURES FOR USE AS RESILIENT CUSHIONS

DETAILED DESCRIPTION OF THE PREFERRED EMBODIMENTS

The present invention relates to a process for making air-filled cellular structures. The process generally comprises providing expanses of generally air-impermeable material, and using a molding structure to bond, seal or weld portions of the expanses together to enclose a volume air within a space defined by the expanses. The process may also include using a molding structure to bond, seal or weld additional portions of the expanses together to decrease the volume of the space defined by the expanses, which may increase the pressure of the air enclosed within the space. The process enables a manufacturer to fabricate non-pressurized and pressurized air-filled cellular structures without having to inflate a structure with air. As such, the process does not require the use of valves and/or other air inlets/outlets that would otherwise need to be sealed after inflating the cellular structures with air, and that can leak and/or be damaged during use. The process also does not require that air be injected into the cellular structures, which would require an injection site that must be sealed and is prone to leakage. The molding structures used for the process enables manufactures to selectively adjust the volume of air to be contained within an air-filled cellular structure, and to fabricate durable air-filled cellular structures that do not include weakened portions that would otherwise be formed upon heating and/or molding the expanses of material during the fabrication process.

Figures 1, 2, 4:
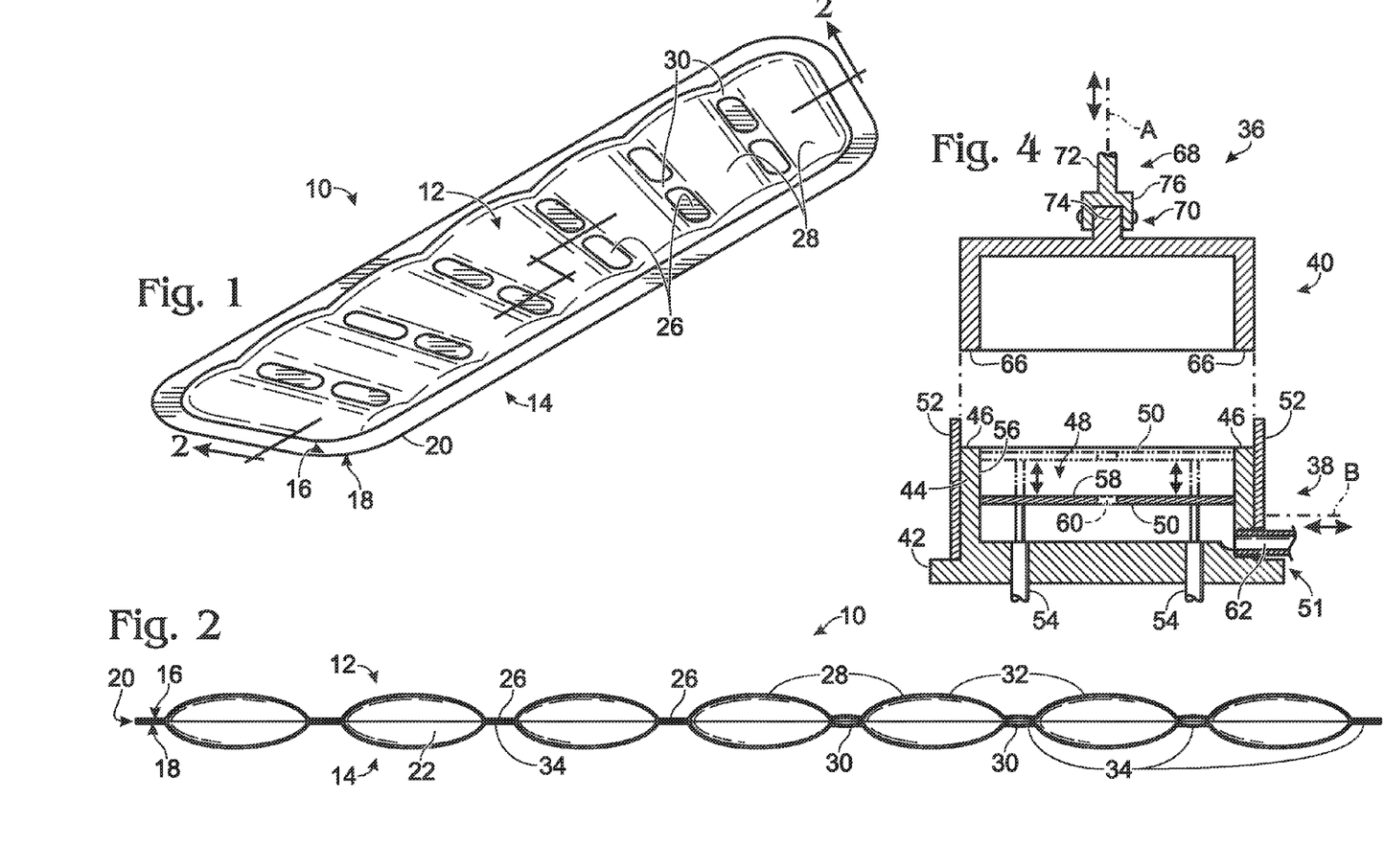
FIG. 1 is a perspective view of an exemplary air-filled cellular structure for use as a resilient cushion.
FIG. 2 is a sectional side view of an exemplary air-filled cellular structure for use as a resilient cushion.
FIG. 4 is a schematic sectional side view of the molding structure of FIG. 3.

FIGS. 1 and 2 show an exemplary air-filled cellular structure 10 that can be made with the present process. The air-filled cellular structure may be comprised of any number of expanses of generally air-impermeable material, such as a top expanse 12 and a bottom expanse 14, which are bonded, sealed or welded together at various locations to form a volume of enclosed air. The expanses may be formed of any suitable air-impermeable material, including plastics, vinyls, rubbers, silicones, and the like. For example, the air-filled cellular structure may be formed of one or more expanses of transparent or opaque plastic material that would not otherwise be suitable for forming air-filled cellular structures using other types of processes, such as injection molding. The materials may be selected for their durability, flexibility, malleability, breathability, comfort, transparency, opacity, etc., so as to enable the molding and fabrication of the air-filled cellular structures, and to enhance the function of the air-filled cellular structures as resilient cushions that may be used in the construction of seating pads, cushions, protective garments, head gear, athletic clothing, and cushioned straps for backpacks, shoulder bags, and the like. Prior to fabricating the air-filled cellular structures, the expanses of material used to construct the air-filled cellular structures may be substantially flat, although the expanses may have any suitable shape consistent with their functions. Likewise, after fabrication, air-filled cellular structures may have any suitable shape consistent with their functions. The expanses of material used to construct a particular air-filled cellular structure may have generally complimentary shapes defined by perimeters, such as perimeter portions 16 and 18. These perimeter portions may be aligned with and bonded, sealed or welded to one another to form a perimeter seal 20, which may function as an air-tight seal between the air enclosed by the expanses 22 and the air external to the expanses. As discussed in more detail below, the process of forming the perimeter seals may cause the expanses to contain air at substantially atmospheric pressure when the air is at or about room temperature.

In some cases, the expanses of material, such as first and second expanses 12 and 14, may also be bonded, sealed or welded together at various positions within the perimeter regions, such as at one or more central seals 26, formed by bonding, sealing or welding additional portions of the expanses together. The central seal(s) may function to define a plurality of discrete air chambers 28 divided or separated from each other by the central seal(s). In some embodiments, such as the embodiment shown in FIGS. 1 and 2, the central seal(s) may not completely seal air within each discrete chamber, but instead may define one or more air passages 30 extending between adjacent air chambers. The air passage(s) may allow the air in one air chamber to be fluidly associated with the air in an adjacent air chamber(s), thereby allowing the air to move between chambers upon application of an external force to the air-filled cellular structure 10. Providing the air passage(s) between adjacent chambers may enhance the ability of the air-filled cellular structure to absorb the force of an impact, because the air within an air chamber receiving the impact can be dispersed amongst a larger enclosed volume. In other embodiments, the central seal(s) may completely seal the air within one or more discrete air chambers. For example, a central seal may extend across an entire dimension, such as the width or length, of the air-filled cellular structure and the central seal may overlap at its ends with the perimeter seal, thereby preventing the air within a sealed air chamber from dispersing into an adjacent air chamber. The location and shape of the central seal(s) may also permit the entire air filled cellular structure to fold, bend, or flex along one or more pre-determined axes.

An air-filled cellular structure 10 may include any number of central seals 26, which may be formed in any desired pattern consistent with the intended use of the air-filled cellular structure. One function of the central seal(s) is to form an air-filled cellular structure having a substantially corrugated shape, with alternating peaks 32 formed by the air chamber(s) 28, and valleys 34 formed by the perimeter seal 20, central seal(s) 26 and/or air passage(s) 30. An air-filled cellular structure having a substantially corrugated shape may be more comfortable as a cushion intended for use against a user's body, because the valleys will allow external air to reach the users body, and improve the breathability of the cushion during use. Moreover, as discussed in more detail below, the central seal(s) may be formed after an amount of air has been contained within the expanses of material, thereby decreasing the overall volume of the air space enclosed by the expanses of material. This may also increase the pressure of air within the air-filled cellular structure 10, and/or within each discrete air chamber 28, in accordance with the universal gas law $PV=nRT$.

Figure 3:
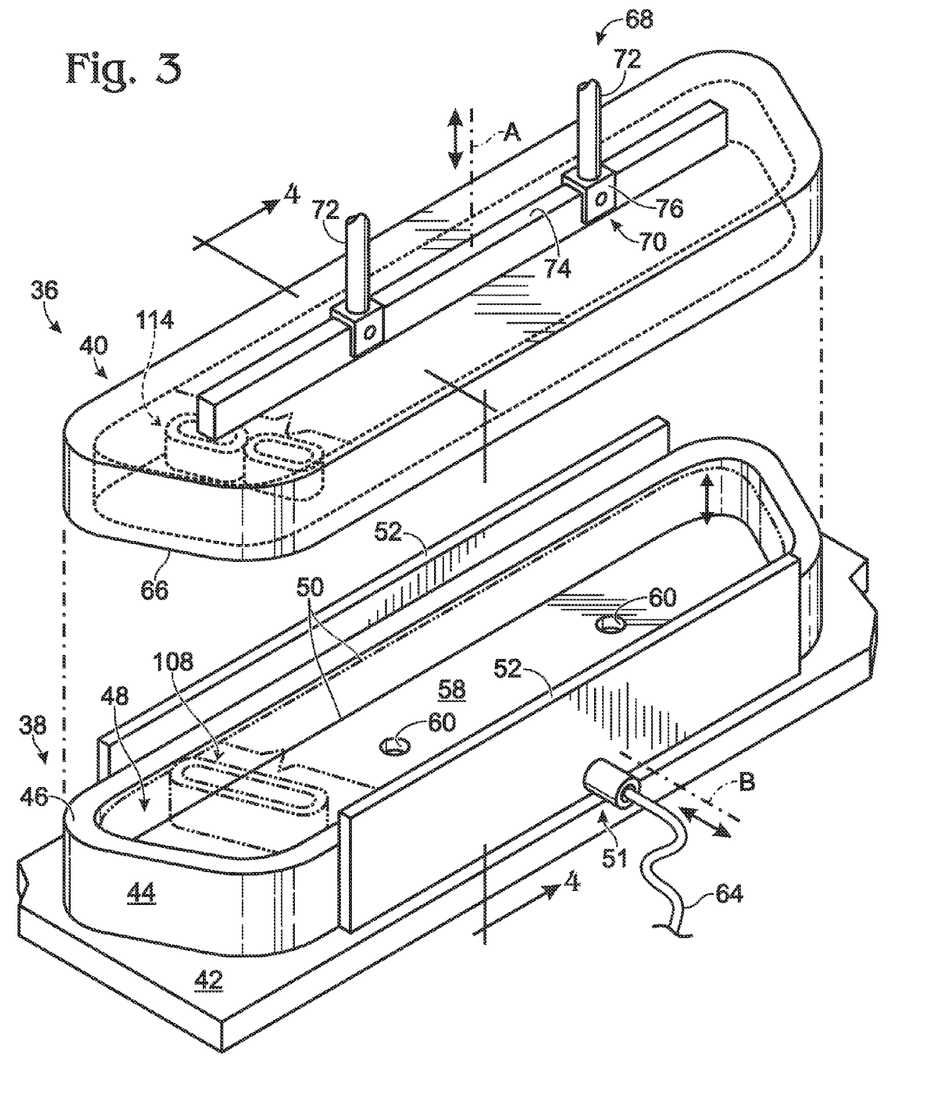
FIG. 3 is a perspective view of an exemplary molding structure for use fabricating air-filled cellular structures.

FIGS. 3 and 4 show an exemplary molding structure 36 for fabricating air-filled cellular structures, which may be used to bond, seal or weld together selected portions of expanses of generally air-impermeable material. The molding structure includes a first molding member 38 and a second molding member 40 that is movable relative to the first molding member, such as along an axis A. The first molding member may be referred to as a bottom molding member and the second molding member may be referred to as a top molding member, where the bottom molding member can be positioned substantially below the top molding member. It will be appreciated, however, that the first and second molding members can be oriented in any manner relative to each other consistent with their functions. Moreover, each of the elements of the first and second molding members may be fabricated of any suitable material(s) consistent with their functions.

The first molding member 38 may include a base 42, walls 44 extending away from the base to a shelf 46 that substantially surrounds a depression 48 defined by the walls and the base, a platform 50 that fits within the depression and is selectively moveable between a plurality of positions relative to the shelf, a vacuum inlet 51 for drawing air from within the depression, and a pair of supports or guides 52 attached to the walls 44 proximate to and extending away from the shelf. The base 42 functions as a supporting structure for the other elements of the first molding member, and as a wall that in-part defines the depression, such as the bottom or base of the depression. The base 42 may also function to house components for selectively moving the platform relative to the shelf and the base, such as hydraulic pistons 54. In some embodiments, the base 42 may be attached to a track or other guide structure (not shown) that enables the first molding member to move between first and second positions along an axis that is transverse relative to axis A, such as along axis B, which is orthogonal to axis A. When the first molding member is moved on the track along axis B to the first position (shown in FIGS. 3 and 4), the first molding member is in position to be engaged with the second molding structure 40, as discussed below. When moved along axis B to the second position (not shown), the first molding structure may not be positioned to be engaged with the second molding structure, but may be positioned to be more easily engaged with expanses of generally air-impermeable material in preparation for bonding together selected portions of the expanses.

As indicated above, the walls 44 extend away from the base 42 and in-part define the depression 48, such as the sides of the depression. It should be appreciated that the walls do not need to be vertical, and the base does not need to be horizontal, because the first molding element can be oriented in space in any desired manner, and the walls and base can thus have any desired orientation. The walls may include an inner wall surface 56 that is substantially orthogonal to the base so as to permit the platform 50 to move towards and away from the base and shelf without being impeded by the wall. The walls may extend away from the base any desired distance, which in turn may correspond to the depth of the depression.

The shelf 46, which may also be referred to as a ledge, a clamping surface, a molding surface, a bonding surface or a welding surface, functions as one of a pair of opposing surfaces for clamping expanses of generally air-impermeable material therebetween. As discussed below, the other of the pair of opposing surfaces 66, which also may be referred to as a clamping surface, molding surface or welding surface, is part of the second molding structure 40, and when the opposing surfaces 46 and 66 are used to clamp together portions of more than one expanse of material, the opposing surfaces may bond, seal or weld those portions of the expanses together to form an air-tight seal having a shape that corresponds to the shapes of the opposing surfaces. As such, the shelf 46 (as well as surface 66) may be constructed to have a shape and size corresponding to the desired shape of a bonded, sealed or welded portion of an air-filled cellular structure. For example, the shelf may include a substantially planar surface for forming a bonded, sealed or welded portion of an air-filled cellular structure that is substantially flat, such as the perimeter seal 20 shown in FIG. 1. The shelf, as well as the walls 44, may be heat conductive elements formed of a heat conductive material and adapted to be heated to a selected temperature by any known method. For example, the walls and/or shelf may be made of heat conductive metals that function as resistors, and heat upon application of an electric current. The shelf and/or walls may further be coupled to any suitable temperature adjustment mechanism (not shown) that selectively adjusts the temperature of the shelf and/or walls to one or more desired temperatures.

As best shown in FIG. 4, the platform 50 fits within the depression 48 and is selectively moveable between a plurality of positions relative to the shelf 46 and/or the base 42. The platform may include a molding surface 58 that, as discussed below, is engaged with portions of generally air-impermeable material during the process for fabricating air-filled cellular structures. In some embodiments, the molding surface may be substantially parallel to the shelf and/or the base. The platform and/or the molding surface may be moved relative to the shelf and/or base with any suitable mechanism, including but not limited to a hydraulic mechanism having hydraulic pistons 54, a rack and pinion system (not shown), and/or one or more levers (not shown). Additionally or alternatively, the platform may be insertable into and removable from the depression, and may have a selected width that causes the molding surface 58 to be at a desired position relative to the shelf when the platform is placed on top of the base. The platform may also be stacked on top of the base and/or other structures until the molding surface is at a desired position relative to the shelf. The platform may include one or more holes 60 that extend through the width of the platform and are fluidly connected to the space beneath and/or around the platform, such that air is sucked through the holes when a vacuum device is used to suck air through the vacuum inlet 51. The platform may be made of any suitable material consistent with its function, including but not limited to foam, plastic, metal, vinyl, rubber, wood, etc. As discussed below, the moveable platform can be used to select a volume of air to be contained within an air-filled cellular structure formed with molding structure 36.

The vacuum inlet 51 may include any structure that allows air to be selectively drawn from within the depression 48. For example, the vacuum inlet may include an air passage 62 defined in the base 42 and/or wall 44, and extending between the depression and the space outside of the depression that can be attached to a vacuum device, such as pump or aspirator, with a vacuum hose 64 or other suitable connector. The vacuum inlet may include any suitable valves for selective adjusting the rate at which air is drawn from within the depression through the vacuum inlet.

The pair of supports or guides 52 may be attached to the sidewalls proximate to and extending away from the shelf. As discussed below, the supports or guides may function to enable proper positioning or shaping of expanses of generally air-impermeable material during the fabrication process. The pair of supports or guides may be opposed to one another, and may be either substantially parallel or oriented transversely to each other, depending on the desired shape of an air-filled cellular structure. For example, the pair of supports or guides may be substantially parallel supports that are generally opposed to and spaced from each other on opposite sides of the depressions so as to form air-filled cellular structures having substantially parallel sides. The supports or guides also may be separated by a selected width corresponding to the desired width of an air-filled cellular structure. It should be appreciated that other structures alternatively or additionally may be used to position, hold, or shape the expanses during the fabrication process, such as clamps, pins, clips, etc.

The second molding member 40, which may also be referred to as a clamping member, bonding member or welding member, may include a surface 66, an actuator 68 for moving the second molding member relative to the first molding member, and an attachment member 70 for attaching the second molding member to the actuator. The surface 66 and the shelf 46 may function as a pair of opposing surfaces for clamping generally air-impermeable material therebetween. As discussed above, the opposing surfaces 46 and 66 may also be referred to as clamping, welding or molding surfaces. The clamping surface 66 may have a shape/size that substantially corresponds to the shape/size of the shelf 46. As discussed below, when the opposing surfaces 46 and 66 are used to clamp together portions of more than one expanse of material, the opposing surfaces may bond, seal or weld those portions of the expanses together to form a seal having a shape that corresponds to the shapes of the opposing surfaces 46 and 66. For example, the opposing surfaces may include a substantially planar surface for forming a bonded, sealed or welded portion of an air-filled cellular structure that is substantially flat, such as the perimeter seal 20 shown in FIG. 1. Like the shelf 46, the clamping surface 66 may be a heat conductive element made of a heat conductive material and adapted to be heated to a selected temperature by any known method. Alternatively or additionally, the shelf 46 and surface 66 may include other mechanisms for bonding the air-impermeable materials with heat, chemicals and/or adhesives.

The actuator 68 includes any suitable mechanism for moving the second molding member 40 relative to the first molding member 48, such as along axis A to engage opposing clamping surfaces 46, 66. For example, the actuator may be a hydraulic press with one or more hydraulic pistons 72. The actuator also may include a mechanism for controlling the rate at which the second molding member moves relative to the first molding member. The attachment member 70 which is coupled to the other elements of the second molding member 40, including the clamping surface 66, provides a purchase for attaching the second molding member to the actuator 68. Any suitable attachment member(s) may be used, including bars, ridges, holes, depressions, brackets, clamps, screws, bolts, etc. For example, as shown in FIGS. 3 and 4, the attachment member may include a bar 74 that can be clamped to the pistons 72 of a hydraulic press with a bracket 76. The actuator may also be fixedly attached to the second molding member, such as welded to or integral with the second molding member.

FIGS. 5-8 show an exemplary process for fabricating an air-filled cellular structure using molding structure 36. As discussed in detail below, the process generally includes: moving the platform 50 to a preselected position relative to the shelf 46, where the preselected position corresponds to a substantially predetermined volume of air to be contained by the air-filled cellular structure; using a vacuum device to draw air from within the depression 48 through the vacuum inlet 51; engaging a first portion 82 of a first expanse 80 of generally air-impermeable material with the shelf, whereby the vacuum device draws a second portion 84 of the first expanse against the moveable platform; and bonding a first portion 88 of a second expanse 86 of generally air-impermeable material to the first portion of the first expanse, thereby enclosing the a volume of air between the first and second expanses.

Figure 5:
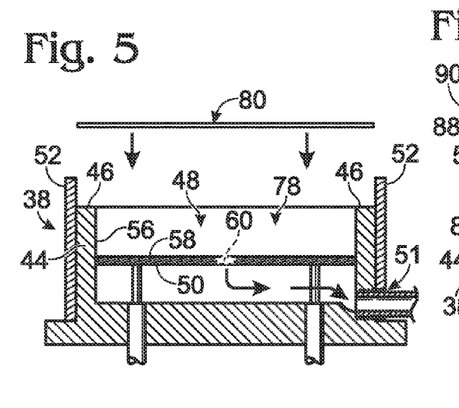
FIG. 5 is a schematic sectional side view of a first expanse of generally air-impermeable material positioned between portions of the molding structure of FIG. 3.

FIG. 5 shows first molding member 38 configured for use in fabricating an air-filled cellular structure, where the platform 50 has been moved to a preselected position relative to the shelf 46, a vacuum device is being used to draw air through the vacuum inlet 51 (as shown by the arrows between hole 60 and vacuum inlet 51), and a first expanse of generally air-impermeable material 80 is positioned above the first molding member 38. The platform 50 and the walls 44 define a space 78 that is above the platform 50 and within the depression 48. As the vacuum device draws air through the vacuum inlet 51, a negative pressure is created below and/or around the platform 50, which in turn causes air to be drawn from space 78, such as around the edges or sides of the platform and through holes 60 in the platform.

Figure 6:
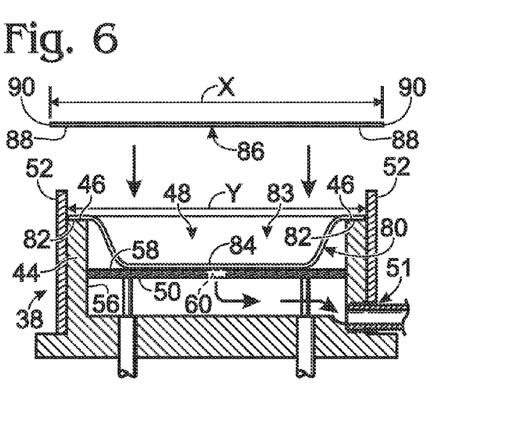
FIG. 6 is a schematic sectional side view of a first expanse of generally air-impermeable material engaged with the molding structure of FIG. 3, and a second expanse of generally air-impermeable material positioned above the first expanse.

As shown in FIG. 6, the suction of air around the edges or sides of the platform 50 and through the holes 60 is used to suck the first expanse 80 against the first molding member 38 into a molded configuration. Specifically, a first portion 82 of the first expanse 80, such as the perimeter of the first expanse, is engaged with the shelf 46, whereby the suction created by the vacuum device draws a second portion 84 of the first expanse against the moveable platform 50. As such, the shelf 46, walls 44 and molding surface 58 form a mold for retaining and/or shaping the first expanse 80 in a molded configuration. Using a vacuum device to draw the first expanse 80 against the first molding member 38 substantially reduces variability in the molded configuration of the first expanse 80, which in turn reduces variability in the shape of an air-filled cellular structure formed during subsequent processing steps. This allows for the reproducible production of air-filled cellular structures having consistent volumes and/or amounts of air contained therein.

Prior to engagement with the first molding member 38, the first expanse 80 is preferably dimensioned so that the first portion 82 can be engaged with the shelf 46 and the second portion 84 can be engaged with the molding surface 58 of the platform 50 without stretching any portion of the first expanse 80. In other cases, portions of the first expanse 80 may stretch slightly upon engagement with the shelf 46 and platform 50.

Figure 7:
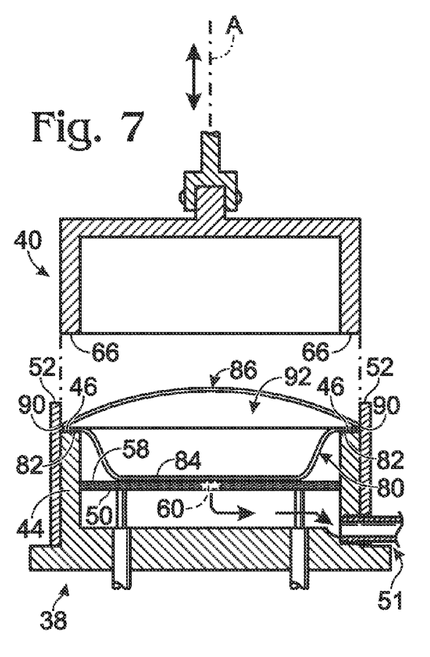
FIG. 7 is a schematic sectional side view of first and second expanses of generally air-impermeable material engaged with the molding structure of FIG. 3.

As shown in FIG. 6, after the first expanse 80 has been engaged with and molded into a molded configuration by the first molding member 38, the first expanse 80 defines a space 83 above the first expanse 80 within the depression 48. In some cases, the volume of space 83 may be substantially the same as the volume of space 78, such as when the first expanse 80 is sucked into contact with substantially all of the mold defined by the shelf 46, walls 44 and molding surface 58. A second expanse 86 of generally air-impermeable material may be positioned above the first expanse 80, where it can be engaged with the first molding member 38 and the first expanse 80. The second expanse 86 may include a first portion 88, such as a perimeter, and a pair of edges 90 that are generally opposed to and spaced from one another. FIG. 7 shows the second expanse 86 engaged with the first molding member 38 above the first expanse 80, such as by positioning the second expanse 86 between the pair of supports or guides 52, and/or by engaging the edges 90 with the supports or guides 52. Alternatively or additionally, second expanse 86 may be positioned or held in place above the first expanse 80 with pins, clips, clamps, etc. The first and second expanses 80 and 86 thereby form a space 92 therebetween. Although FIG. 7 shows second expanse 86 arched between guides 52, second expanse 86 alternatively may be configured to be substantially planar when it is positioned above the first expanse 80, such as by dimensioning the second expanse 86 to fit between the guides 52 in a substantially planar configuration, and by forming the second expanse 86 of materials that are sufficiently rigid so as to maintain its substantially planar shape when supported by shelf 46. In such cases, the space 92 between the first and second expanses has substantially the same volume as space 83.

Figure 8:
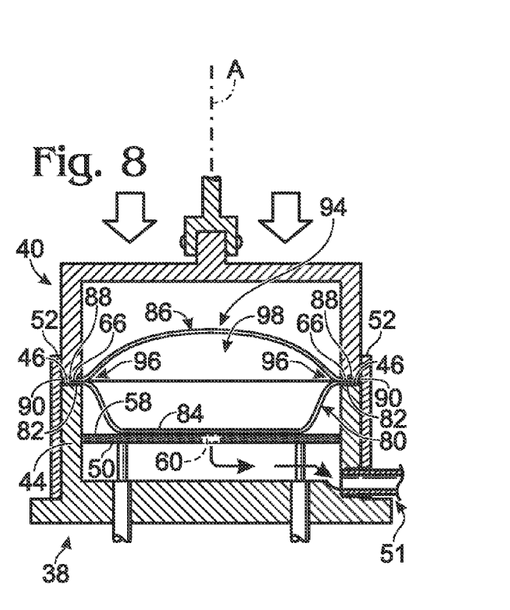
FIG. 8 is a schematic sectional side view of the molding structure of FIG. 3 being used to bond together portions of first and second expanses of generally air-impermeable material to enclose an amount of air.

As shown in FIG. 8, the second molding member 40, or clamping member, is moved along axis A towards the shelf 46 until the first portion 82 of the first expanse 80 and the first portion 88 of the second expanse 86 are clamped between the shelf 46 and the opposing clamping surface 66. The first portions 82 and 88 are then bonded together to form a first air-filled cellular structure 94 having an air-tight seal 96. The air-tight seal 96 may be formed by applying heat to the first portions 82 and 88, thereby bonding or welding them together, such as by heating opposing surfaces 46 and 66. Alternatively or additionally, an adhesive or chemical may be used to bond the first portions 82 and 88 together. The first and second expanses 80 and 86 form a volume 98 enclosing an amount of air, where the air may be substantially at or around atmospheric pressure when at room temperature.

As discussed below, several variables affect the volume of air 98 contained within the first air-filled cellular structure 94, including the dimensions of the first and second molding members 38 and 40, the preselected position of the moveable platform relative to the shelf 46, and the dimensions of the first and second expanses 80 and 86. With respect to the dimensions of the first and second molding members 38 and 40, it should be appreciated that larger molding members can be used to form air-filled cellular structures having greater volumes, and smaller molding members can be used to form air-filled cellular structures having smaller volumes.

The preselected position of the moveable platform 50 relative to the shelf 46 also affects the volume of the air-filled cellular structure 94 and the volume of air 98 contained therein. As discussed above, moving the platform 50 to a preselected position relative to the shelf 46 defines a space 78 with a preselected volume. The volume of space 78 (FIG. 5) corresponds to the volume of space 83 (FIG. 6) defined by the first expanse 80 when it is in the molded configuration. As discussed above, the volume of space 83 may be substantially the same as, or slightly less than the volume of space 78. Moreover, the volume of space 83 can be calculated or predetermined based on the dimensions of the depression 48 and the position of the platform 50 relative to the shelf 46. As such, the preselected position of the moveable platform corresponds to a substantially predetermined volume of air to be contained by the first air-filled cellular structure 94, because the greater/lesser the known volume of space 83, the greater/lesser the volume of air 98 that will be contained within the air-filled cellular structure 94.

The dimensions of the first and second expanses 80 and 86 also affects the volume of air 98 contained within the air-filled cellular structure 94. The dimensions of the first expanse 80 generally will be selected based on the size of the molding members 38 and 40 and the selected position of the platform 50 relative to the shelf 46. As discussed above, the first expanse 80 is preferably dimensioned so that it will not stretch when it is engaged with the first molding member 38 in a molded configuration (FIG. 6), although first expanse 80 could be stretched onto the first molding member 38 if it were held in place by pins, clamps, clips, etc. As such, the dimensions of the first expanse 80 generally affect the variability of the volume of space 98 in the same manner that selecting the position of the platform 50 affects the volume of space 98.

The second expanse 86 may be dimensioned so that the first portion 88 can be bonded to the first portion 82 of the first expanse 80 to form an air-filled cellular structure having any desired shape and volume. In some embodiments (not shown), when the second expanse 86 is in a substantially planar configuration, the first portion 88 may have substantially the same size and shape (e.g. width and length) as the shelf 46, such that the first portion 88 of the second expanse 84 can be engaged with and bonded to the first portion 82 of the first expanse 80 to form an air-filled cellular structure having a volume of air 98 that is substantially the same as the volume of space 83.

In other embodiments, such as the one shown in FIGS. 6-8, the first portion 88 of the second expanse 86 may be larger than the shelf 46 when the second expanse 84 is substantially planar, such that the first portion 88 of the second expanse 86 can be engaged with and bonded to the first portion 82 of the first expanse 80 to form a first air-filled cellular structure 94 containing a volume of air 98 that is greater than the volume of space 83. For example, as shown in FIG. 6, when the second expanse 86 is substantially planar or flat, the opposing edges 90 of the second expanse 84 may be spaced from each other by a width X that is greater than the width between opposite sides of the shelf 46 and/or is greater than the space Y between the supports or guides 52. In these embodiments, at least some of the second expanse 86 must be folded, bent, curved, or otherwise shaped in a non-planar manner along its width so that the first portion 88 of the second expanse 86 can be aligned with and bonded to the first portion 82 of the first expanse 80. For example, as shown in FIG. 7, when the second expanse 86 is positioned between the supports or guides 52, each of the edges 90 may be engaged with one of the supports 52, and the second expanse 86 may be curved so that the volume of the space 92 between the first and second expanses is greater than the volume of space 83. The second expanse 88 may be sufficiently rigid so as to retain its curved shape when the edges 90 are engaged with the supports 52. As shown in FIG. 8, after bonding the first portions 82 and 88 together, the volume of air 98 contained within the air-filled cellular structure 94 will be greater than the volume of space 83. The dimensions of the second expanse 88 may be preselected or calculated based on the desired volume of space 98.

The first air-filled cellular structure 94 formed using molding elements 38 and 40 may be processed further with other molding elements to form other air-filled cellular structures.

For example, additional molding elements may be used to bond, seal or weld together various portions of the first and second expanses 80 and 86 to form central seals, such as central seals 26 shown in FIGS. 1 and 2. As discussed above, these central seals may function to define a plurality of discrete air chambers, such as air chambers 28, and/or to decrease the overall volume of the air space enclosed by expanses 80 and 86. Decreasing the volume of the air space may, in turn, increase the pressure of air within the air-filled cellular structure, and/or within each discrete air chamber, in accordance with the universal gas law PV=nRT.

Figure 9:
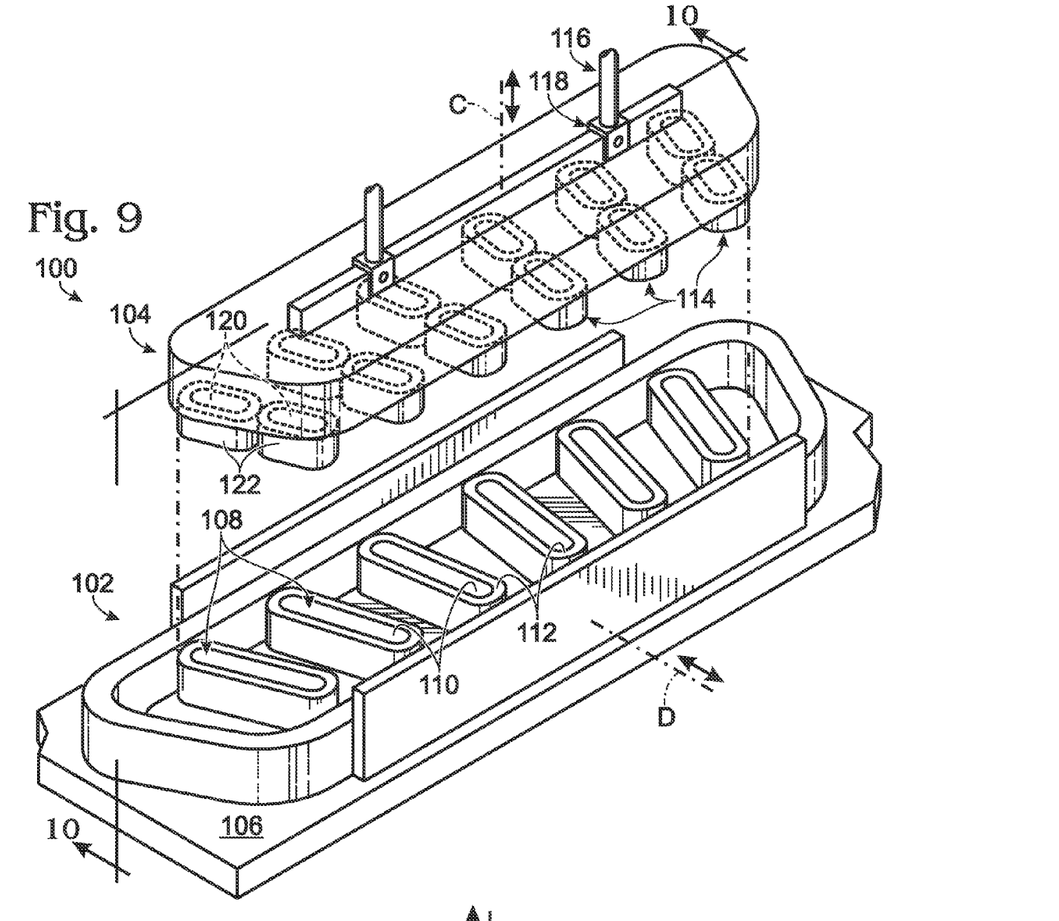
FIG. 9 is a perspective view of another molding structure for use fabricating air-filled cellular structures.
Figure 10:
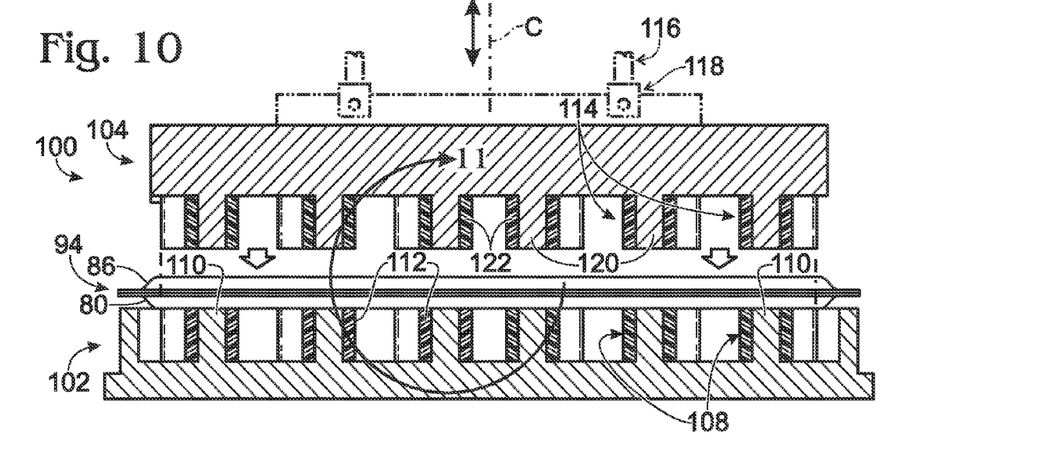
FIG. 10 is a schematic sectional side view of an air-filled cellular structure positioned between portions of the molding structure of FIG. 9.

FIGS. 9 and 10 show an exemplary molding structure 100 for forming central seals in an air-filled cellular structures. The molding structure 100 may include a third molding member 102 and a fourth molding member 104 which may be used to bond, seal or weld together selected portions of the first and second expanses 80 and 86. The fourth molding member 104 may be moveable relative to the third molding member, such as along axis C. The third molding member may be referred to as a bottom molding member and the fourth molding member may be referred to as a top molding member, where the bottom molding member can be positioned substantially below the top molding member. It will be appreciated, however, that the third and fourth molding members can be oriented in any manner relative to each other consistent with their functions. Moreover, each of the elements of the first and second molding members may be fabricated of any suitable material(s) consistent with their functions.

The third molding member 102 may include a base 106 and one or more clamping members 108, among other structures similar to those of the first molding member 38. The base 106 functions as a supporting structure for the other elements of the third molding member 102. In some embodiments, the base 106 may be attached to a track or other guide structure (not shown) that enables the first molding member to move between first and second positions along an axis that is transverse relative to axis C, such as along axis D, which is orthogonal to axis C. When the first molding member is moved on the track along axis D to the first position (shown in FIGS. 9 and 10), the first molding member is in position to be engaged with the fourth molding structure 104, as discussed below. When moved along axis D to the second position (not shown), the third molding structure 102 may not be positioned to be engaged with the fourth molding structure 104, but may be positioned to be more easily engaged with an air-filled cellular structure in preparation for forming central seals.

Each clamping member 108 may include one or more bonding or welding members 110 and one or more insulating members 112. Each bonding or welding member 110 may be formed of a heat conductive material adapted to be heated to a selected temperature by any known method. For example, the bonding or welding members may be made of heat conductive metals that function as resistors, and heat upon application of an electric current. The bonding or welding members 110 may be coupled to any suitable temperature adjustment mechanism (not shown) that selectively adjusts the temperature of the shelf and/or walls to one or more desired temperatures. Each insulating member 112 may at least partially surround a corresponding bonding or welding member, such as is shown in FIGS. 9-12, and may be formed of an insulating material, or in some cases a substantially non-heat conductive material, including but not limited to silicon, rubber, and various plastics.

The fourth molding member 104 may include one or more clamping members 114, an actuator 116 for moving the fourth molding member relative to the third molding member, and an attachment member 118 for attaching the fourth molding member to the actuator. Similar to clamping members 108, each clamping member 114 may include one or more bonding or welding members 120 and one or more insulating members 122. Each bonding or welding member 120 may be formed of a heat-conductive material adapted to be heated to a selected temperature in a substantially similar manner as bonding or welding members 110. Each insulating member 122 may at partially surround a corresponding bonding or welding member, and may be formed of similar materials as insulating members 122.

The actuator 116 and attachment member 118 may have substantially the same structure and function as actuator 68 and attachment member 70, discussed above. The actuator 116 may function to move the fourth molding member 104 until it engages the third molding member 102, such as along axis C.

Figure 11:
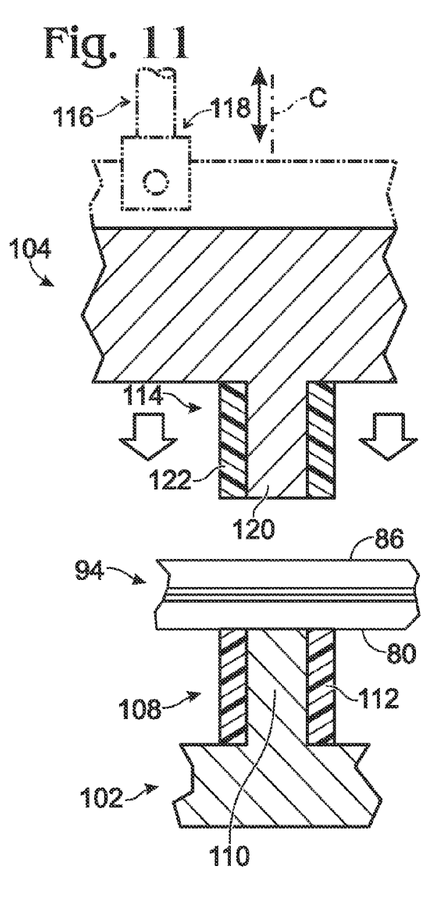
FIG. 11 is another schematic sectional side view of an air-filled cellular structure positioned between portions of the molding structure of FIG. 9.
Figure 12:
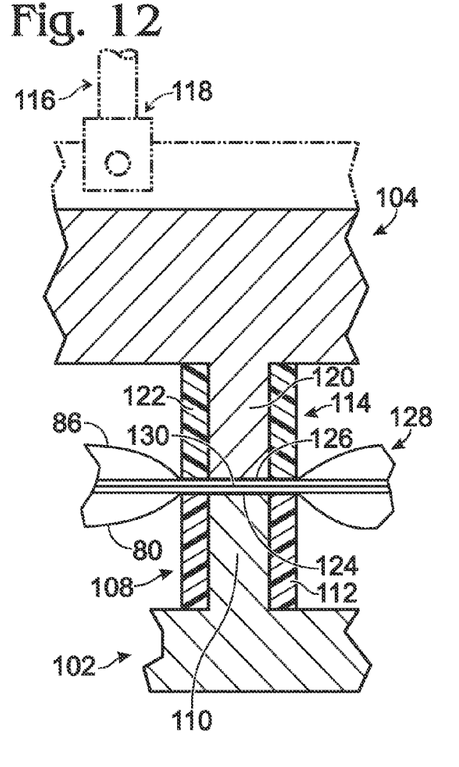
FIG. 12 is a schematic sectional side view of the molding structure of FIG. 9 being used to bond together various portions of an air-filled cellular structure.

As shown in FIGS. 10-12, each clamping member 108 may function with a corresponding clamping member 114 as a pair of opposing clamping members for clamping selected portions of expanses 80 and 86 therebetween, and for bonding or welding selected portions of expanses 80 and 86 together to form a central seal having a desired structure. Specifically, each bonding or welding member 110 may function with at least one corresponding bonding or welding member 120 to clamp selected portions of the expanses 80 and 86 therebetween and to bond those portions together to form a central seal, such as by heating the expanses to weld the selected portions together, or by clamping the selected portions together so that they bond together by use of an adhesive or chemical agent. Each insulating member 112 may function with at least one corresponding insulating member 122 to clamp together portions of the expanses 80 and 86 that are adjacent to the portions clamped between the opposing bonding or welding members 110 and 120.

FIG. 10 shows the first air-filled cellular structure 94 positioned between the third and fourth molding members 102 and 104, with the first expanse 80 mounted on or engaged with the clamping members 108 of the third molding member 102, and the second expanse 86 facing the clamping members 114 of the fourth molding member 104.

As shown in FIGS. 11 and 12, the actuator 116 is used to move the fourth molding member 104 along axis C until portions of the expanses 80 and 86 are clamped between the opposing clamping members 108 and 114. For example, a third portion 124 of the first expanse 80 and a second portion 126 of the second expanse 86 are clamped between the opposing bonding or, welding members 110 and 120, and the portions of the first and second expanses adjacent to the third portion 124 and the second portion 126 are clamped between the opposing insulating members 112 and 122. In embodiments where the opposing bonding or welding members function to heat the expanses 80 and 86, the opposing bonding or welding members 110 and 120 may be heated to bond together the third portion 124 and the second portion 126 to form a second air-filled cellular structure 128 having one or more central seals 130, similar to the central seals 26 shown in FIGS. 1 and 2. The portions of expanses 80 and 86 clamped between the opposing insulating members 112 and 122 may be heated slightly during the process of forming the central seal 130, but may or may not be heated sufficiently to bond together. The insulating members 112 and 122 may have sufficient thickness to prevent the opposing bonding or welding members from heating any portion of the expanses 80 and 86 that are not clamped between the opposing clamping members 108 and 114.

As shown in FIG. 12, when the first and second expanses 80 and 86 are clamped between the opposing clamping members 108 and 114, the volume within the air-filled cellular structure decreases, which may in turn increase the pressure of the air within the air-filled cellular structure. The present process of manufacturing air-filled cellular structures thus enables the fabrication of pressurized air-filled cellular structures, such as air-filled cellular structure 128, without the use of valves and/or other air inlets/outlets.

When the pressure of the air within the air-filled cellular structure is greater than atmospheric pressure, such as when the expanses 80 and 86 are clamped between opposing clamping members 108 and 114, the air contained in the air-filled cellular structure applies a force to the portions of the expanses 80 and 86 that are not clamped between the opposing clamping members 108 and 114, but does not apply any force to the clamped portions of the expanses. The opposing insulating members 112 and 122 clamp together the portions of the expanses 80 and 86 adjacent to but not in direct contact with the opposing bonding members 110 and 120, thereby preventing the air contained in the air-filled cellular structure from applying a force to those portions. In the absence of any opposing insulating members 112 and 122, the air contained in the air-filled cellular structure would apply a force to the portions of the expanses 80 and 86 adjacent to but not in direct contact with the opposing bonding members 110 and 120, and those adjacent portions would be heated slightly upon heating the opposing bonding members 110 and 120. This may cause the air contained in the air-filled cellular structure to stretch and/or rupture the heated portions of the expanses adjacent to but not in direct contact with the opposing bonding members 110 and 120. Air-filled cellular structures with stretched or weakened portions adjacent the central seals 130 are less durable than air-filled cellular structures without stretched or weakened portions adjacent the central seals. The opposing insulating members 112 and 122 thus enable the fabrication of durable air-filled cellular structures that do not include weakened portions that would otherwise be formed upon heating and/or molding the expanses 80 and 86 during the fabrication process.

In some embodiments, a molding structure having a single set of opposing molding members may be used to form both a perimeter seal and central seal(s). For example, as shown in FIG. 3 in dashed lines, the first molding member 38 may be modified to include structures equivalent to the clamping member(s) 108 of the third molding member 102, and the second molding member 40 may be modified to include structures equivalent to the clamping member(s) 114 of the fourth molding member 104. As such, the modified first and second molding structures 38 and 40 could be used to simultaneously form a perimeter and central seal(s), or could be used to sequentially form both the perimeter seal and the central seal(s). It will be appreciated that these modifications may require slight modifications to other structures associated with the first and second molding members 38 and 40. For example, the moveable platform 50 would need to be modified to include apertures (not shown) defined through its width to accommodate the clamping member(s) 108 as the platform 50 moves relative to the shelf 46. Likewise, the second molding member 40 may require multiple actuators 72 and/or attachment members 76 to enable sequentially moving the clamping surface 66 into engagement with the shelf to form a perimeter seal followed by moving the clamping member(s) 114 into engagement with the clamping member(s) 108 to form central seal(s).

The various components of the process disclosed herein may be made of any suitable material and may be any size and shape consistent with their functions. The specific embodiments of the process disclosed and illustrated herein are not to be considered in a limiting sense as numerous variations are possible. Ordinal indicators, such as first, second or third, for identified elements in the specification or the claims are used to distinguish between the elements, and do not indicate a required or limited number of such elements, and do not indicate a particular position or order of such elements unless otherwise specifically indicated. The subject matter of this disclosure includes all novel and non-obvious combinations and subcombinations of the various features, elements, functions and/or properties disclosed herein. No single feature, function, element or property of the disclosed embodiments is essential.

What is claimed is:

1. A method for fabricating an air-filled cellular structure for use as a resilient cushion, comprising:
   providing a molding structure including a shelf substantially surrounding a depression, and a platform that fits within the depression and is selectively movable between a plurality of positions relative to the shelf;
   moving the platform to a preselected position relative to the shelf, wherein the preselected position corresponds to a substantially predetermined volume of air to be contained by the air-filled cellular structure;
   using a vacuum device to draw air from within the depression;
   engaging a first portion of a first expanse of generally air-impermeable material with the shelf, whereby the vacuum device draws a second portion of the first expanse of material against the moveable platform;
   bonding a first portion of a second expanse of generally air-impermeable material to the first portion of the first expanse, thereby enclosing a volume of air between the first and second expanses.

2. The method of claim 1, wherein the bonding step includes positioning the second expanse above the first expanse to form a space between the first and second expanses.

3. The method of claim 2, wherein the first and second expanses each include a perimeter, and wherein the bonding step includes aligning the perimeters of the first and second expanses and bonding the perimeters to each other to form an airtight seal.

4. The method of claim 1, wherein the molding structure further includes a pair of supports that are proximate to and extend away from the shelf, and are generally opposed to and spaced from each other on opposite sides of the depression, and wherein the bonding step includes positioning the second expanse between the supports above the first expanse to form a space between the first and second expanses.

5. The method of claim 4, wherein the second expanse includes a pair of edges that are generally opposed to and spaced from each other by a width that is greater than the width of the space between the supports when the second expanse is flat, and the bonding step includes engaging each edge of the second expanse with one of the supports, whereby the second expanse is positioned above the first expanse.

6. The method of claim 5, wherein when each edge of the second expanse is engaged with one of the supports, at least some of the second expanse is curved.

7. The method of claim 1, wherein the molding structure includes a clamping member that is movable relative to the shelf, and the bonding step includes clamping the first portions of the first and second expanses between the shelf and the clamping member.

8. The method of claim 1, wherein while the first portions of the first and second expanses are clamped between the shelf and the clamping member, at least one of the shelf and the clamping member heat the first portions of the first and second expanses.

9. The method of claim 8, wherein the shelf and the clamping member each include one of a pair of opposing heat-conductive elements.

10. The method of claim 1, further comprising bonding a third portion of the first expanse to a second portion of the second expanse, thereby decreasing the volume of air enclosed between the first and second expanses.

11. The method of claim 10, wherein at least a part of the third portion of the first expanse is a part of the second portion of the first expanse.

12. The method of claim 10, wherein the step of bonding the third portion of the first expanse to the second portion of the second expanse includes clamping together the third portion of the first expanse and the second portion of the second expanse with opposing clamping members, and heating the third portion of the first expanse and the second portion of the second expanse.

13. The method of claim 12, wherein each of the opposing clamping members includes one of a pair of opposing heat-conductive members and one of a pair of opposing insulating members partially surrounding its corresponding heat-conductive member, wherein the pair of opposing heat-conductive members are adapted to clamp together and heat the third portion of the first expanse and the second portion of the second expanse, and the pair of opposing insulating members are adapted to clamp together selected portions of the first and second expanses adjacent to the third portion of the first expanse and the second portion of the second expanse.

14. The method of claim 10, wherein the step of bonding the third portion of the first expanse to the second portion of the second expanse forms an air-filled cell having a plurality of discrete air chambers.

15. The method of claim 14, wherein the air in at least some of the plurality of air chambers is fluidly associated.

16. The method according to claim 1, wherein pressure of the volume of air between the first and second expanses is substantially atmospheric pressure.

17. The method according to claim 15, wherein pressure of the volume of air in the air chambers is greater than atmospheric pressure.

* * * * *